May 11, 1937.  L. S. BURGETT  2,079,956
AUTOMATIC WELDING HEAD
Filed March 16, 1934  4 Sheets-Sheet 1
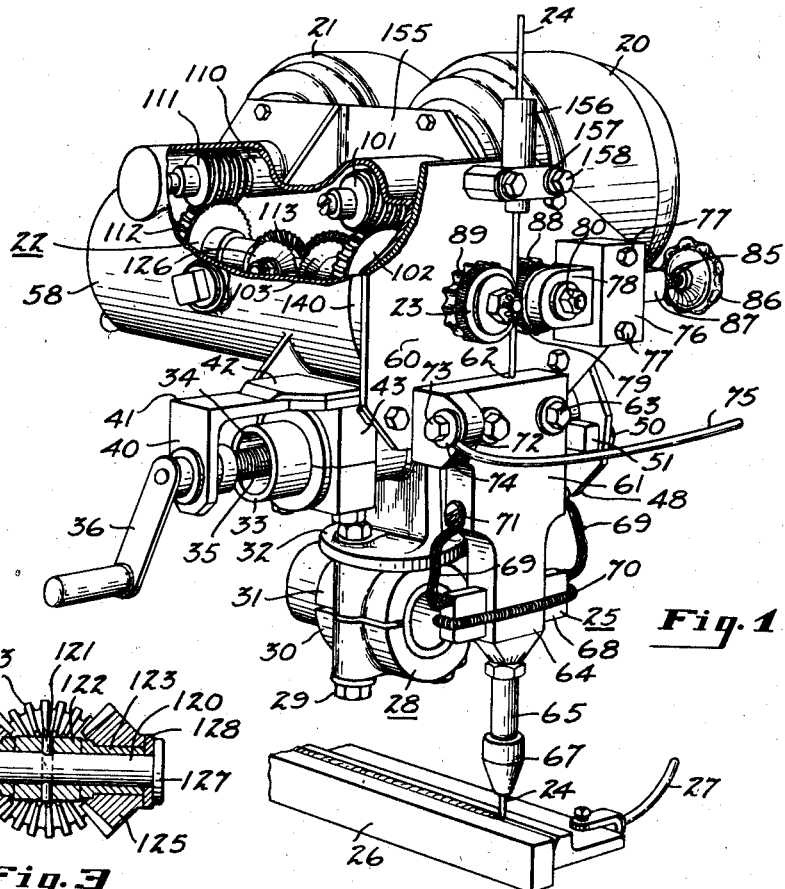
INVENTOR
Lynn S. Burgett
BY
ATTORNEY

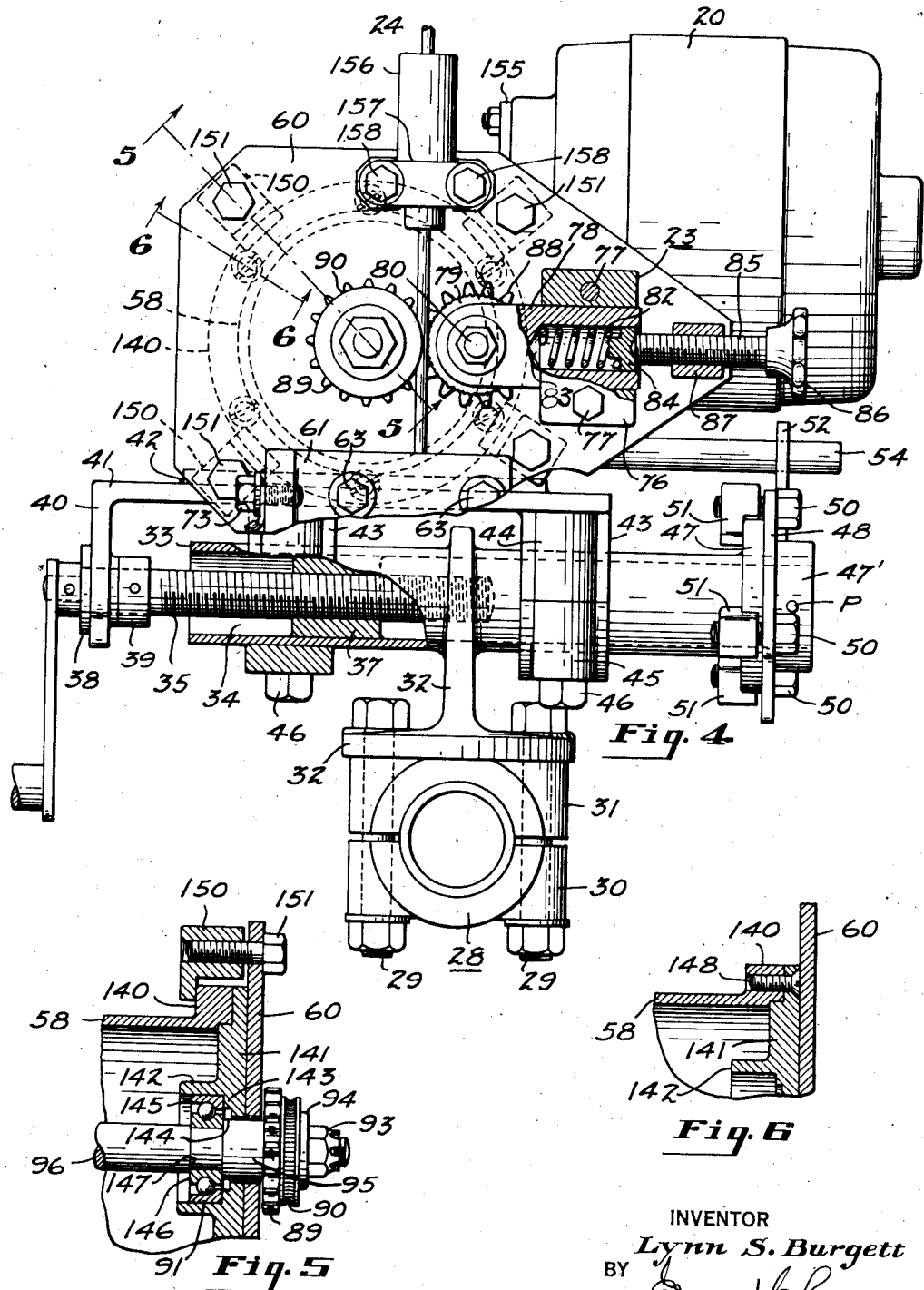

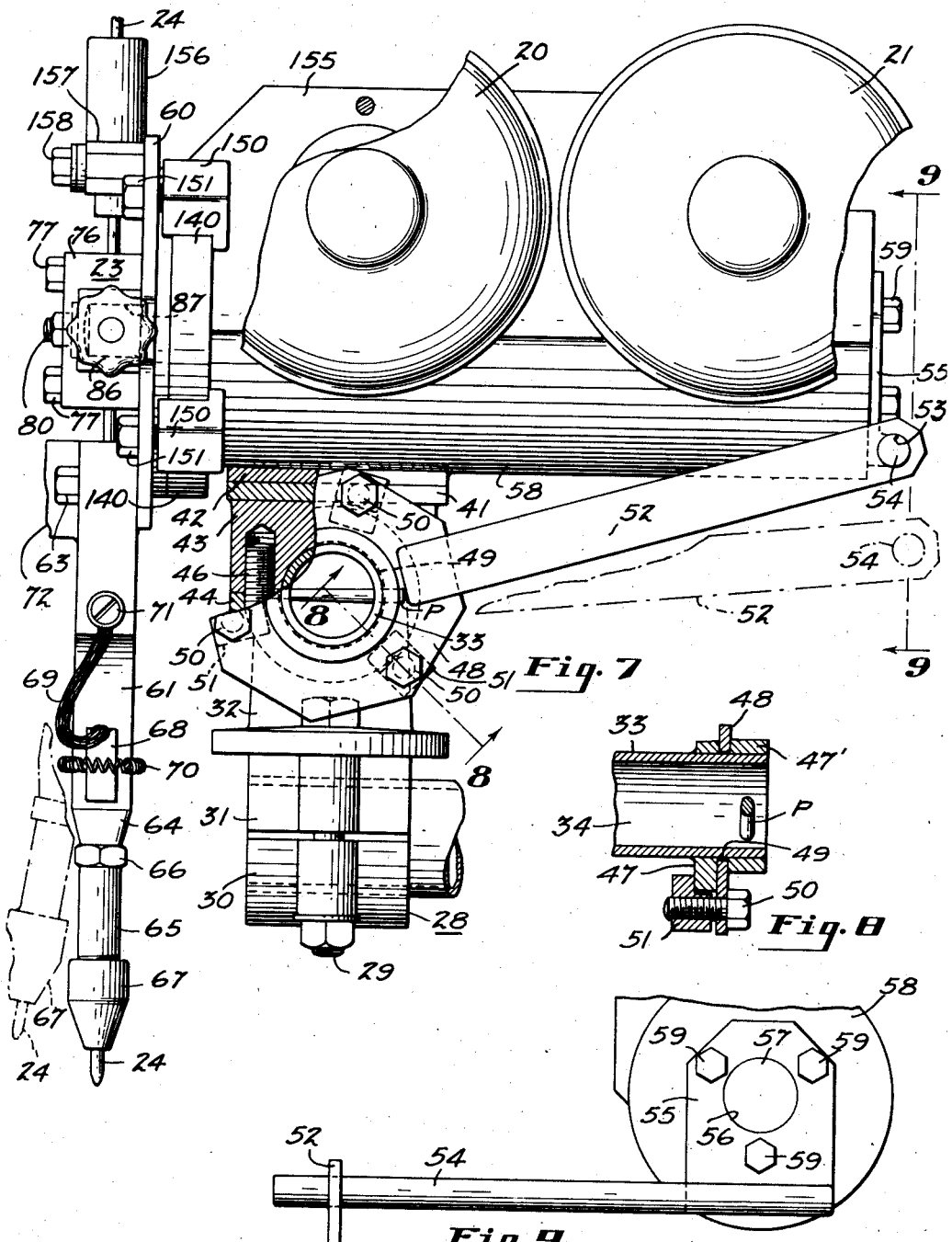

Patented May 11, 1937

2,079,956

UNITED STATES PATENT OFFICE 2,079,956

AUTOMATIC WELDING HEAD

Lynn S. Burgett, Euclid, Ohio, assignor to Una Welding, Inc., East Cleveland, Ohio, a corporation of Delaware Application March 16, 1934, Serial No. 715,869

38 Claims. (Cl. 219—8)

This invention relates to arc welding machines and more particularly to an arc welding head for properly feeding an electrode to the arc. It is an object of the invention to provide a head that is readily adjustable so that the electrode may be properly located above the work; and also so that the direction in which the electrode approaches the work, or the angle between the electrode and the work, may be adjusted both laterally and longitudinally of the work.

A further object is to provide a feed mechanism that is automatic in its operation; that is very sensitive so that its speed may be readily changed, and also so that the direction of feed may be practically instantaneously reversed.

It is another object of the invention to provide a head of this type that is intercontrolled with the welding circuit, and also, by which the carriage travel mechanism is controlled.

It is a further object of the invention to provide a mechanism by which the length of arc may be set at a predetermined variable length, and which length of arc will be maintained by means of an automatic feeding mechanism.

It is a further object of the invention to provide an automatic electrical welding head, the breaking of the circuit of which will break the welding circuit.

A further object of the invention is to provide a carriage travel mechanism that may be manually or automatically controlled for either forward or reverse motion.

A further object of the invention is to provide a welding head that will not jam the electrode against the work when the circuit of the head is opened.

Another object of the invention is to provide a feed mechanism operated by a motor, the speed of which is not affected by the torque demand, so that the operating force is not dependent upon the length of the arc. In other words, the feed mechanism is so designed that when the driving motor encounters mechanical resistance of any sort, the necessary torque is not dependent upon arc voltage, so that change in arc length is not necessary to supply the necessary torque for overcoming the resistance.

In the drawings, wherein like reference numerals designate like parts:

Figure 1 is a perspective view of the automatic welding head.

Figure 2 is a horizontal section through the axis of the differential mechanism.

Figure 3 is a section on line 3—3 of Figure 2.

Figure 4 is a view partly in section, looking to the right front of Figure 1.

Figure 5 is a section taken on line 5—5 of Figure 4; and Figure 6 is a section on line 6—6, of Figure 4.

Figure 7 is a rear view of the device looking toward the back of the motors.

Figure 8 is a view on line 8—8, of Figure 7; and Figure 9 is a view on line 9—9, of Figure 7.

Figure 10:
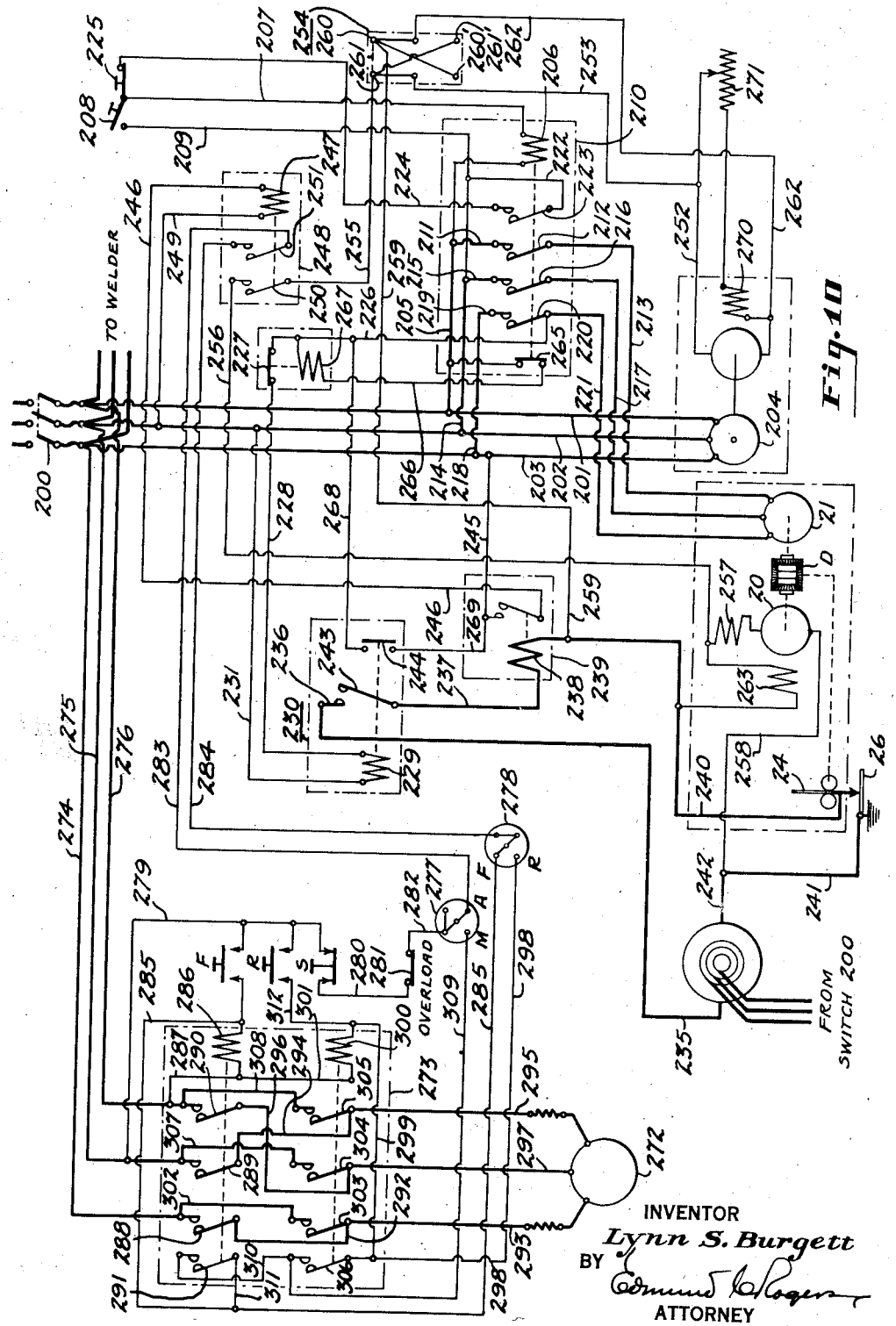
Figure 10 is a diagram of the electrical circuit.

The device embodies, generally speaking, a two-motor drive including motors 20 and 21, of which, motor 20 is D. C. and motor 21 is A. C. Motor 21 is the downward feeding motor. It is a constant speed motor, so that even when mechanical resistance is encountered, by the electrode being fed, so that the feed mechanism has a tendency to slow down, the feeding rate will continue substantially unchanged. In the usual feed mechanism, the control of the feed is such that an increase in arc length is designed to increase the speed, because in normal operation an increase in arc length indicates too slow a feeding rate of the electrode. In such types of mechanism, the motor is purposely subject to change of speed. If mechanical resistance slows the motor down, its torque will be reduced so that even less than normal force is available to overcome the increased resistance. The only way this torque can be increased is by a lengthening of the arc, which, in the design, acts to increase the feed motor speed. In the present device, this effect is avoided by the use of a constant speed feed motor, operable independently of arc length. Motors 20 and 21 operate through a differential, generally indicated at 22, to drive a feed mechanism 23, that feeds the electrode 24 down through adjusting mechanism, including brushes, generally indicated at 25, that conduct electricity into the electrode 24. From that point, the electrode is conveyed down adjacent work 26, to which is connected a cable 27 to complete the circuit.

The structure is mounted by means of a clamp mechanism 28 adapted to embrace a rod or bar, and to be clamped thereon by means of screws 29. Clamp 28 comprises a lower section 30 and an upper section 31, bolted together by means of the screws 29. The screws 29, likewise pass upwardly through the support member 32 that is welded to tube 33. Tube 33 is hollow as at 34 and extending axially therethrough, is an adjusting screw 35 controlled by handle 36. The screw 35 engages in a nut member 37 welded within the tube 33. On the end of the screw toward the handle 36 is a collar member 38, having a flange 39 embracing a lower projection 40 of an L-shaped member 41. The opposite end of the L-shaped member 41 is secured to the lower flange of the head member 42. Depending from this flange, are two sliding journals 43 embracing the tube to have a sliding fit. Each member 43 includes an upper member 44 and a lower member 45 secured together by bolts 46.

Thus, it will be seen that rotation of handle 36 forces the screw member axially along the tube member 33 and that by means of collar 38 and L-shaped member 41, the latter being secured to the head member, the motion of the screw is transmitted to the head member, the head member reciprocating along tube 33 and supported thereon by sliding journals 43. To the end of the tube opposite collar member 38, is a flange 47 integral therewith. A hub plate 48 having an opening 49 therein, slips around the end of the tube and abuts against collar 47. The plate has three holes spaced therearound, through which screws 50 extend, the other end of these screws engaging L-shaped lugs 51, the ends of which engage over flange 47. A collar member 47' fits over the outer end of tube 33 to hold hub plate 48 in place even when screws 50 are loose. This collar is held on tube 33 by a pin P as shown in Fig. 8, the pin engaging in a slot in the tube. Tightening of screws 50, binds hub plate 48 in fixed position against shoulder 47. Extending radially from hub plate 48, is a lever bar 52 that extends along behind and below the two motors 20 and 21. This lever 52 is integral with hub plate 48. At the outer end of this lever 52 is a hole 53, through which slidably extends a rod 54. At the end of rod 54, opposite lever arm 52, is a bracket plate 55 having an opening 56 therein, engaging around the projection 57 on the end of the differential housing 58. The bracket plate 56 is bolted as at 59 to the differential housing. Thus, it will be seen that the head member cannot rotate about the axis of tube 33 because of the engagement of rod 54 with lever arm 52, the latter being rigidly secured to the tube 33, which prevents such rotation. At the same time, however, it will be seen that adjustment of the head about the tube 33 may be obtained by loosening the screws 50, holding the lugs 51 and clamping the hub plate and lever arm 52 to the tube. Reciprocating movement of the head by screw 35 is not prevented by these members, because rod 54 has free sliding movement through arm 52.

As heretofore noted, the electrode 24 is conveyed downwardly through feed mechanism 23. This feeding mechanism is mounted on a plate 60 in a manner to be hereafter described. It will be noted, however, at this time, that plate 60 is secured to the differential housing 58. At the lower part of plate 60, is a block member 61, having an opening 62 extending therethrough, through which the electrode is directed. The block member 61 is secured to plate 60 by bolts 63. In the lower end of block 61, is a nose-like projection 64, to the lower end of which is secured an extension tube 65 of adjustable length. The extension tube 65 is threaded on to nose 64, it being internally threaded and having on the outside thereof, an integrally formed hex 66. To the lower end of extension 65, is secured a nozzle tip 67, through which the electrode 24 extends. Brushes 68 are slidably mounted in nose 64 and comprise block-like members, to which the ends of flexible cables 69 are fastened. A tension spring 70 engages around the brushes and urges them inwardly so that they will insure contact with electrode 24, as the same is fed through the nose-like member 64. The other ends of flexible cables 69 are secured to the block member 61, as by screws 71. A boss member 72 extends from adjacent one edge of block member 61, and is designed to receive a bolt member 73, having a washer 74, to clamp the cable 75 that conducts the current from the welder. The plate member 60 has bolted thereto a guide block 76, same being bolted by bolts 77.

Sliding through the guide block 76, is a reciprocating support 78, supporting at its outer end the knurled feed roll 79, adapted to rotate on axle 80, screwed into the support 78. The reciprocating support 78 has a bore therein. Within the bore is a coil spring 82, abutting against the end of the bore as at 83 and against a washer 84 adjacent to the other end. The washer 84 is engaged by a screw member 85, having a handle 86 thereon, the screw being threaded into a block 87 formed integral by welding or otherwise, with the plate 60. In operation, the handle 86 is turned so that screw 85, through spring 82, forces support 78 inwardly against the electrode 24, the spring 82 maintaining pressure against the electrode. The knurled roll 79 has integrally formed therewith, a gear 88 that is in mesh with another gear 89, mounted adjacent thereto. Integral with gear 89 is a knurled roller member 90 adapted to cooperate with knurled member 79 in feeding the electrode 24 downwardly through hole 62. The shaft 96 is mounted at its ends by means of bearings 91 and 92 in the aforementioned housing 58. A nut 93 on the end of the shaft 96, having the gear thereon, engages against a washer 94 to maintain gear 89 in place. Collar 95 spaces gear 89 from bearing 91.

Shaft 96 is driven through a differential gear by means of motors 20 and 21. Motor 20 has extending therefrom a stub shaft 100, having a worm 101, secured to the end thereof. This worm 101 meshes with the worm gear 102, journaled for free rotation on shaft 96. Integral with worm gear 102, is a miter gear 103, the two gears being united through a sleeve 104. This unit is journaled on a shaft by means of journals 105 and 106. Likewise, motor 21 has a stub shaft 110 extending therefrom, having a worm 111, secured thereto to rotate therewith. Worm 111 engages worm gear 112, that is integral with miter gear 113, the two being united through sleeve 114, journaled as at 115 and 116 for free rotation on shaft 96. A cross shaft 120 is pinned at at 121, to main shaft 96, to rotate therewith. The manner of securing them is as follows: Main shaft 96 has a rectangular portion 122, this portion being drilled to receive shaft 120. The pin 121 extends through this block portion 122 and through the shaft 120, extending through the drilled portion. Bushings 123 and 124 are mounted on the projecting ends of the cross shaft 120, and mounted over these bushings, are bevelled gears 125 and 126. These bevelled gears are engaged by the miter gears 103 and 113. One end of cross shaft 120, has a head 127 thereon, engaging against a washer 128 to hold bevelled gear 125 on the shaft. At the other end, a similar washer 129 is held against the bevelled gear 126 by means of a castellated nut 130.

The housing 58 has a flange 140. Secured to the flange 140, is a bearing retaining plate 141 that extends down and surrounds the collar 95. The plate has an extending annular projection 142 thereon, having a shoulder 143 and recess 144. The outer race 145 of the bearing is slipped in within the annular part 142, against shoulder 143, the recess 144 being provided for the lubrication of the bearing. The inner race 146 abuts against a shoulder 147 of the shaft 96. The plate 141 is held to flange 140 by means of screws 148. A similar mounting is provided for the bearing 92.

In setting up the shaft 96 and its associated parts, the outer race of bearing 92 is slipped within its retaining plate, similar to plate 141. The inner race is placed on shaft 96 and the shaft is slipped into position so that the inner and outer races are properly aligned. At the other end of the shaft, the inner race is secured over the plate to engage shoulder 147 and then the collar spacer member 95 is added. The plate 141 into which is placed the outer race 145, is then slipped into position and screwed therein by means of screws 148. The remaining feeding mechanism and like structure is then put into position.

End thrust of the shaft is taken up outwardly against the respective bearings. The fit is tight so that there is no end play, and consequently no necessity of having means to take inward thrust on the shaft. The flange member 140 of the housing 58 abuts plate 60, the plate 60 surrounding spacer member 95, but being freely rotatable thereabout. Lugs 150 engage around the flange 140 and are secured to the plate by means of screws 151. It will thus be seen that rotation of the housing 58 and the parts maintained thereon, relative to plate 60 and the parts maintained thereon, may be had by loosening screws 151 and manually rotating the plate relative to the housing. They may be secured in any adjusted position by tightening screws 151.

The motors 20 and 21 are mounted on a back plate 155, that is integral with housing 58.

On the top of plate 60, is a guide member 156 secured by clamping block 157 to the plate 60, the clamp 157 being joined to the plate by means of screws 158.

The wiring of the above machine is as follows: A three-phase line comes into a main three-pole switch 200, from the inside of which extend three separate lines, all in parallel. As shown, one extends to the welder, the second to the travel carriage mechanism, and the third to the head operating mechanism. Closing of switch 200, then energizes the leads to these respective parts of the device. Of course, these three circuits could be separate, but this union of them furnishes a convenient and simplified means for their operation. In particular, closing of switch 200 energizes the motor-generator set 204 through lines 201, 202 and 203.

A push button switch 208 is connected across lines 201 and 202 by means of leads 205, 207, 209 and 214. In this circuit, is a solenoid 206 adapted to operate the four pole switch generally indicated at 210. The switch 210 opens or closes the circuit to alternating current down motor 21, the three phases being carried as follows: line 201, lead 205, lead 211, pole 212, lead 213 to the motor; line 202, lead 214, lead 215, pole 216, lead 217 to the motor; line 203, lead 218, lead 219, pole 220, lead 221 to the motor 21. A normally closed interlock switch 225 is put across the switch 208. A blade 223 designed to operate with the three phase blades of switch 210, upon energization of solenoid 206, closes the circuit around switch 208 so that it is not necessary to hold switch 208 closed, more than momentarily. As soon as interlock blade 223 is closed, the maintaining circuit for switch 210 is: line 201, lead 205, coil 206, lead 207, switch 225, lead 224, blade 223, lead 214 to line 202.

Connected across one phase of the circuit and designed to be controlled by one of the blades of switch 210, such as blade 220, is a relay 229. The circuit to the relay is as follows: line 203, lead 218, lead 219, pole 220 of switch 210, lead 226, through normally closed relay 227, lead 228, coil 229 of the switch generally indicated at 230, thence through lead 231, to line 202. The relay 229 closes the switch 230 to close the welding circuit, providing contact is established between the electrode 24 and the work 26, as will be hereinafter described. The welding circuit originates at the D. C. generator side of the welder and passes through lead 235, lead 236, through blade 243 of switch 230, lead 237, coil 238 of relay 239, through lead 240, electrode 24, work 26, lead 241 and lead 242 back to the welder. If contact is not established between electrode 24 and work 26, the welding circuit will, of course, be broken at that point.

Mechanically connected to close at the time blade 243 closes, upon energization of coil 229, is an interlock switch 244. As soon as this pole is closed, a circuit around pole 220 is closed so that switch 230 is held closed independently of switch 210. This circuit is as follows: line 203, lead 245, lead 269, interlock 244, lead 268 to lead 226, and thence through time relay 227, lead 228, coil 229, lead 231 to line 202.

The switch 239 controlled by the welding circuit, closes across the lines, a circuit including the coil 247 of a relay 248. The circuit is as follows: line 203, lead 245, switch 239, lead 246, coil 247, lead 249 to line 202. The switch 248 has two poles, 250 and 251. Pole 250 is a control in the circuit of the upwardly retracting D.C. motor 20, hereinafter designated as the up motor. This motor is energized from the generator of motor generator set 204. This circuit is as follows: from the generator to line 252, lead 253, reversing switch 254, lead 255, pole 250 of switch 248, lead 256 to series field 257 of D. C. motor 20; thence through the armature of the motor, out through lead 258 into the welding lead 241, through work 26, electrode 24, lead 240, lead 259, lead 262 and back into the generator. The reversing switch 254 placed in this circuit, includes poles 260 and 260', and 261 and 261', that are selectively engageable as shown. A shunt field 263 is placed across the line of up motor 20.

An interlock 265, designed to close only when switch 210 is open, is placed in the circuit of coil 229 to control it. Included in the circuit, by means of which interlock 265 so controls coil 229, is a time relay 227, having a coil 267, the time relay opening upwardly. Thus, the interlock 265 closed as soon as main switch 210 opens, holds coil 229 energized for a predetermined period after switch 210 is opened, so that switch 230 remains closed for a short time after the head switch 225 is opened. The circuit is as follows: line 203, lead 245, lead 269, pole 244, lead 268, lead 226, coil 267, lead 266 switch 265 lead 205 to line 201.

The output of the generator of motor generator 204 is controlled by a variable resistance 271, in series with the self-excited shunt field winding 270. This variation in the field of the generator changes the speed of motor 20 so that, as will be hereinafter shown, the feeding rate of the electrode may be varied. This change of output of the generator, has the further and more important effect of changing the arc length as desired.

The operation of the device is as follows: The electrode 24 is threaded through guide 156, the feed mechanism 23, the hole 62 of block 61, between brushes 25, and out through nozzle 67 to a point adjacent the work. The tension on the feed mechanism is adjusted by handle 86. The work is properly connected to one pole of the welder. The mechanical adjustment of the head is then made so that the welding will take place at the proper location and with the electrode at the proper angle with the work. This adjustment includes the pivotal movement of plate 60, upon which is supported the electrode 24, about housing 58. This pivotal movement provides for the adjustment of the electrode with the work in a direction transversely to the work. It also provides a lateral adjustment of the electrode relative to the work. Additional lateral adjustment is obtained by rotating screw 35 by its operating handle 36, which reciprocates the entire housing together with plate 60 and associated parts, across the work. Additionally, the angle at which the electrode is directed toward the work in a direction longitudinally of the work, is adjusted by loosening screws 50 and making the proper angular adjustment of bar 52. It may be observed that in many instances, the welding is more successful where the electrode is directed at an angle toward the work.

As soon as the machine has been mechanically adjusted properly, the main switch 200 is closed. The lines to the carriage travel motor 272, the welder, and the motor of motor generator 204 are all then charged. However, the only circuit then closed is the motor of motor generator 204 which immediately begins to run. The switch 208 is closed, that energizes coil 206 to close switch 210. The interlock 223 immediately shunts across switch 208 and the push button of switch 208 may be released, switch 210 being maintained closed through the circuit of the interlock. Upon closing of this switch, the A. C. motor 21 is energized and begins to feed the electrode 24 downward.

At the same time the above circuit is energized, the circuit through coil 229 of switch 230 is energized off pole 220 of switch 210 and the switch 230 is closed. When it closes, interlock 244 is closed shunting out pole 220 from this circuit, so that switch 230 remains closed independently of switch 210. The blade 243 of switch 230 makes or breaks the circuit of the welder indicated in the heaviest lines. This circuit is also dependent upon the arc's being struck. In view of the fact that the down motor 21 is now in operation, the electrode 24 will soon be brought into contact with work 26, and as pole 243 is likewise closed, the welding circuit will be complete. The contact of electrode 24 with work 26 produces a momentary short circuit in the circuit of the welder, and as will be hereinafter shown, speeds up up-motor 20.

As soon as current starts flowing in the welding circuit, the coil 238 of switch 239 is energized and the switch is closed. Closing of this switch completes the circuit from line 203, through coil 247 of relay switch 248, as hereinbefore described. Switch 248 is then closed so that the carriage travel circuit is closed for operation, and simultaneously the D. C. up motor 20 is energized from the generator of motor generator set 204.

The arc is capable of being energized either from the welder or from the generator, or from both. In the generator circuit, there are two principal components of load, these being the series field and armature 257 of the up motor 20, and the arc. Of course, the shunt field 263 stays across the line of this generator. The generator has fixed potential under load. When the electrodes are short-circuited, immediately before the arc is established, practically the only load on the generator is the series field and armature of motor 20. Consequently, the motor 20 will speed up, because substantially the entire output of the generator is being spent through the series field and armature of this motor. The motor then speeds up and attains a speed greater than that of A. C. down motor 21. As soon as this occurs, through the differential action, the electrode 24 is retracted from the work and the arc is established. Upon establishing the arc, the output of the generator is now divided between the series field and armature of motor 20 and the arc itself. This means that less energy is supplied for the operation of the motor 20 so that the motor slows down. When the arc reaches a predetermined length, and consequently, attains a predetermined resistance, the amount of energy available for operation of motor 20 is only such as to balance the operation of motor 21 through the differential D. If the arc becomes any longer so that its resistance is increased beyond this point of equilibrium between motors 20 and 21, that is to say, so that the energy available for operation of the motor 20 is less than enough to balance the operation of motor 21, the motor 21 will then, through the differential, feed the electrode downwardly and will seek again the point of equilibrium.

Actually, the constant consumption of the electrode in the arc produces the effect of incrementally increasing the resistance through the arc so that motor 21 correspondingly incrementally feeds the electrode down to overcome loss by its being consumed. Practically, this amounts to, by integration of these incremental movements, the establishment of a condition of dynamic equilibrium, in which the electrode is fed downwardly automatically, at a rate exactly equal to the rate of consumption in the arc or deposit of weld material.

It will be seen that the operation of the feed mechanism then varies in accordance with variation of the voltage drop across the arc. It has been found convenient to design the circuit so that a change of one volt in the voltage drop across the arc produces a change of 100 R. P. M. in the speed of the D. C. motor 20. This is made possible by selecting a high speed, low voltage motor. In such, even small changes of voltage constitute large percentage changes in total voltage; and as voltage and speed vary substantially directly, this percentage, as applied to a high speed motor, produces a speed change of a large R. P. M. value. The ratio of change in speed to change of voltage in a motor of this kind is substantially straight-line or continuous, in direct proportion, because the shunt field of the motor always receives full excitation; whereas obviously, the series field and armature receive varying voltage.

When the drop through the arc increases to such a point that the voltage drop through the series field and armature of motor 20 is reduced, the effect will be to tend to reduce the speed of the motor in direct proportion. The motor, however, by its own inertia will tend to rotate at a higher speed than the speed for which it is being energized; and consequently, it operates as a generator so long as this condition exists. By virtue of having the shunt field at full excitation, the generator effect is greatly increased; and until the motor settles down to the speed of equilibrium for the new value of charge across it, a very pronounced dynamic braking effect is obtained. This is very desirable, since it means that the motor responds very quickly to such changes.

The above described effect is especially valuable in welding on irregular work. Thus, if when welding along work, an obstruction in the nature of an elevation is encountered, the electrode will move toward the obstruction until the arc tends to shorten, at which time, the up motor tends to speed up the lift of the electrode. It will attain a greater speed of rotation than for normal operation. If this rotation of the up motor were unchecked, the up motion of the electrode would be continued, even though it had been lifted to the point where the proper arc length were established, and a hunting action would result. As was pointed out, the dynamic braking effect of the motor prevents this overriding and provides that the up motor shall slow down to its speed of equilibrium, practically instantly upon the arc's being lengthened to the proper length.

The normal speed of the A. C. down motor 21 may be selected at some constant value. I have found 1800 R. P. M. a convenient speed. Of course, this value is arbitrary and any one may be selected. The speed of the D. C. motor 20 is variable, but in the values herein chosen for illustration, when its speed is 300 R. P. M. less than the down motor, the differential effect is designed so that the electrode will be fed at a rate equal to the normal consumption in the arc, of the average electrode. Now, as has been observed, a change of voltage of one volt in the arc drop, produces a change of 100 R. P. M. in the speed of the motor 20. Consequently, a three volt change in the arc produces a change of 300 R. P. M. in the motor, and if the differential speed between the two motors for normal feeding of the electrode is 300 R. P. M., a decrease of three volts in voltage drop across the arc will absolutely stop the feeding mechanism, as the two motors will be running at the same speed; and because of the differential, this will stop the feeding of the electrode. Any additional decrease in the voltage drop across the arc will increase the speed of the D. C. up motor until it is greater than the speed of the A. C. down motor, and the electrode will be lifted. Therefore, a change of any amount over 300 R. P. M. in the speed of the up motor is sufficient to completely reverse the direction of feed of the electrode. How great an advantage this is, to produce complete reversal in this manner, may be seen by comparing this with the ordinary feed, wherein a feed motor is operating at say, 1800 R. P. M. Such a motor must not only be slowed down 1800 R. P. M. before it will stop, but it must be slowed down and completely stopped before it can be reversed. In other words, the energy of rotation in one direction must be completely spent before the motor can be reversed to change the direction of feed of the electrode. In the present device, however, neither motor changes its direction of rotation, even for reversing the direction of feed.

To stop the machine, switch button 225 is pushed, which de-energizes coil 206 and allows switch 210 to open. This cuts off down motor 21. As motor 21, which is the down motor, slows, the arc is lengthened and the up motor now receiving less voltage, also slows down. Owing to the fact that up motor 20 is thus attempting to prevent lengthening of the arc, it will attempt to slow down, so that it continues to run at a speed less than the motor 21. This has two effects; the first is to produce a much longer arc having substantially less penetration; and the second is to withdraw the end of the electrode from the work for reloading. When this has continued for a time predetermined by the characteristics of the time relay 227, the arc is extinguished as follows: The interlock 265 that was closed as soon as switch 210 was opened, since it is mechanically connected to switch 210 for such operation, has closed the circuit through coil 267 of time relay 227, which opens switch 227 after the predetermined period of operation for the time relay.

In a short while after energization of coil 267, the time relay 227 is opened, de-energizing coil 229 which permits switch 230 to open. This opens the welder circuit. As soon as the welding circuit is opened, series coil 233 is de-energized, switch 239 is opened, opening the circuit of the relay 247.

De-energization of coil 247 opens the switch 248 and more particularly, the blade 250 thereof that controls the circuit from the generator of motor generator 204, to the D. C. up motor 20. The D. C. up motor 20 is thus stopped. The machine is entirely out of operation now.

The above described manner of stopping the operation is necessary for the following reasons. The A. C. down motor during normal operation is rotating at a speed greater than the speed of the D. C. up motor. If the entire circuit were suddenly opened, the inertia of rotation of the A. C. down motor would be greater than that of the up motor, owing to its greater speed. Therefore, it would continue to feed the electrode down even though the circuit would be de-energized. This would, of course, result in jamming the electrode against the work. With the D. C. up motor operating after the down motor 21 is shut off, the electrode will not be jammed against the work, but will be retracted so as to be in position for subsequent work. A further disadvantage in opening the circuit very suddenly, lies in the fact that as the arc travels along the work, a crater or depression is produced by the arc. This results only when a short arc is used. When a long arc is used, the depression does not occur. Consequently, in view of the fact that the D. C. motor 20 does not stop instantly, but continues for a short period after the A. C. down motor 21 stops, the arc is stretched out and the depression is avoided for the last little portion of the operation.

Provision is made for reversing the polarity of the machine as follows: The reverse switch 254 is thrown to the direction opposite to that shown and the polarity of the welder is reversed in a similar manner. As a result, potentials of the generator of motor generator 204 and of the welder again buck with polarity reversed from what it was in the originally described set-up.

*Carriage travel motor*

As heretofore mentioned, switch 248 has an additional blade 251. This blade produces intercontrol between the travel carriage motor 272 and the welding, when it is desired that the travel carriage motor shall be operated automatically. Switch 251 is closed only when the welding current is flowing. The motor 272 controlling the travel of the carriage, is shown here as a three phase A. C. motor, operated from lines 274, 275 and 276 of switch 200, as hereinbefore described. A reversing switch 273 is placed in the lines of motor 272. This switch is magnetic and has manual and automatic control of its operating coils. The circuit for the automatic operation of motor 272 is placed across from line 275 to line 276 and includes: lead 279, stop switch S, lead 280, overload 281, lead 282, switch 277, emerging at pole A, lead 283, blade 251, lead 284, switch 278, emerging at the pole F, lead 285, to operating coil 286 and through lead 287 to the line. The switch 277 has two poles; the pole A being for automatic operation, and the pole M being for manual operation. The switch 278 in the automatic line has poles F and R and determines whether the travel shall be forward or in reverse. The reverse circuit as controlled by switch 278 includes the hereinbefore mentioned leads into switch 278. Instead of emerging from point F and going out lead 285 etc., the current emerges at pole R of the switch and goes through lead 298, lead 299, operating coil 300 of the reversing poles of switch 273, through lead 301, lead 287 to line 276.

Switches have been provided for manual operation of the travel carriage motor. A switch F is shunted across leads 279 and 285 for manually effecting forward operation of the travel carriage motor. Upon closing switch F, current may flow from line 275, through lead 279, switch F, coil 286, lead 287 to line 276. An interlock is provided to obviate the necessity of holding switch F closed. The interlock has a blade 291, closed, when the main forward poles are closed, that makes a circuit around the push button F as follows, the switch 277 having previously been changed from position A to position M: line 275, lead 279, stop switch S, lead 280, overload 281, lead 282, switch 277, emerging at M, lead 309, lead 310, pole 291, lead 311, lead 285, coil 286, lead 287 and line 276. Thus, the coil 286 is energized even though switch F is opened.

In like manner, a manual reversing switch R operates. This closes circuit from line 275, lead 279, switch R, lead 312, coil 300, line 301, line 287 and line 276. Similarly, upon energization of coil 300, an interlock switch 306 is closed, shunting out switch R as follows: line 275, lead 279, switch S, lead 280, overload 281, lead 282, switch 277, lead 309, switch 306, lead 299, coil 300, lead 301, lead 287 to line 276.

It is to be observed that switch 273 is designed so that it is mechanically impossible to close both the forward and reverse poles at the same time.

Upon closing the forward switch either manually or automatically, the three phases are conveyed to the motor 272 as follows: line 274, blade 288, lead 292, lead 293, to the motor; line 275, blade 289, lead 294, lead 295 to the motor; and line 276, blade 290, lead 296, lead 297 to the motor. When the reversing switch is closed either manually or automatically, the motor is energized as follows: line 274, lead 302, pole 303, lead 293 to the motor; line 275, lead 307, pole 304, lead 297 to the motor; and line 276, lead 308, pole 305, lead 295 to the motor.

The operation of the carriage travel motor is as follows. As heretofore noted, the travel carriage mechanism may be automatically or manually controlled. For automatic control, the switch 277 is set to the point A, whence upon closing of switch 247, the travel carriage is moved forward or in reverse in accordance with the setting of switch 273. Likewise, for manual operation of the motor 272, switch 277 is set to the M position and the push buttons F and R are used. It is to be noted, that these push buttons control the interlocks 291 and 306, so that the buttons themselves need be contacted only momentarily. Manual operation of the carriage travel motor is frequently necessary to align the work even when automatic operation is contemplated for the actual welding operation.

For stopping the carriage travel motor under any circumstances i. e., either under manual or automatic operation, the stop button S can be pressed which opens the circuit into switch 277. The overload 281 is conventionally entered into the circuit.

*Further operations*

The above operations have been what are generally designated as automatic operation and manual operation. This machine is capable of a further type of operation known as semi-automatic. In this type of operation, a flexible conduit of some appropriate type, such as is disclosed in an application of applicant and William A. Dougherty, Serial No. 570,366, filed October 22, 1931, since matured into Patent No. 1,953,915, dated April 3, 1934, is attached on to the nozzle 67. The electrode 24 is fed through this nozzle, and is held adjacent the work, and moved thereover, by the operator. The feeding mechanism for the electrode will operate in the same manner as for full automatic control, that is to say, it will establish and maintain constant an arc of certain length. This semi-automatic operation is particularly valuable for use over irregular work where the automatic could not conveniently be used.

It will be seen that I have provided a welding head that will readily automatically adapt itself to irregularities that produce a change in arc conditions. It is also a head, the feed of which is readily reversible through the medium of the differential and the dynamic braking effect of the compound wound motor 20, together with the constant speed motor 21.

I have further provided a head, automatically operated through intercontrol with the welding circuits; and which head may be furth r intercontrolled with the travel carriage motor.

I have further provided a means for varying the length of arc produced by the head in which the automatic means will maintain this arc, whatever its length.

I have further provided a carriage travel mechanism that may be manually or automatically operated at the will of the welder and which may be readily operated either forward or in reverse.

It is to be understood that the disclosure is simply illustrative and that the scope of the invention is to be defined not by this illustration, but by the appended claims.

I claim:—

1. In a device of the kind described, a support, a member mounted on said support for reciprocation thereover, and for oscillation therearound, a plate mounted on said member for adjustment thereon, means securing said plate member in adjusted position, and an electrode supporting means on said plate.

2. In a device of the kind described, a mechanism for feeding wire or wire-like elements, including a driving means delivering constant speed for moving the wire in one direction, and a second motor for moving the wire in the other, and means for placing one motor in circuit after a predetermined movement of the wire by the other motor.

3. In a device of the kind described, a mechanism for feeding wire or wire-like elements, including a driving means delivering constant speed for moving the wire in one direction, and a variable speed motor for moving the wire in the other, and means for placing one motor in circuit after a predetermined movement of the wire by the other motor.

4. In a device of the kind described, an arc welding machine, a welding circuit including said machine, an electrode feeding mechanism including one motor for moving the electrode in one direction, and a second motor for moving the electrode in the other direction, the operation of only one motor being responsive to changes in the length of the arc, and the operation of said one of said motors being dependent upon a flow of current in the welding circuit.

5. In a device of the kind described, a feeding mechanism for feeding wire or the like, including a motor for driving said mechanism in one direction, a second motor for driving in the other direction, and means for causing one of said motors to operate as a dynamic brake when it tends to produce in excess of a predetermined drive in its given direction.

6. In a device of the kind described, a feeding mechanism for wire or the like, an external welding circuit including a constant speed motor for driving the mechanism in one direction, and a variable speed motor for driving it in the other, said drive being effected through a differential, the operation of one of said motors being dependent on a flow of current in the electrical circuit.

7. In a feeding mechanism for wire or the like, means for driving the mechanism in either of two directions, but normally in only one, and means to automatically insure that when the feeding mechanism is cut off, the final direction of feeding will be in the direction other than that of normal feeding.

8. In a mechanism for feeding wire or the like toward work, a first means for driving the mechanism to feed the wire to the work, a second means for driving the mechanism to retract the wire from the work, a control for the operation of said feeding means including a shut off therefor having means to shut off the first means before the second means is shut off.

9. In a system of the kind described, a welder circuit, an electrode feed mechanism circuit, the latter including a motor for driving the feed mechanism in one direction, a second motor for driving the feed mechanism in the other direction, a source of power for said second motor, normally open lines conveying said power to said second motor, and means operable by said welding circuit for closing said lines.

10. In a system of the kind described, a welding circuit including an arc welding electrode, means for feeding said electrode toward the work, and retracting it therefrom, said latter means including an electric motor, means for energizing said motor, said energizing means also passing through the electrode and the arc so that variation in the arc length varies the energy available for the motor, and consequently varies the speed thereof.

11. In an automatic welding head, a support, a standard mounted on said support for adjustment thereon, a slide track on said standard transverse to said support, a housing mounted on said slide for movement therealong, and rotation about the axis thereof, said housing having the electrode feed mechanism therein.

12. In an automatic welding head, a base, a standard movably mounted on the base, a housing, means mounting the housing on said standard for translatory and rotary adjustment relative to the base, an electrode feed roll on said housing, an electrode nozzle, and means mounting the nozzle onto the housing for adjustment angularly about said feed roll as a center.

13. In an automatic welding head, a base, a standard mounted on the base, a journal-like support on the standard, a housing mounted for rotation thereon, and means adapted to be clamped to the journal and having an extension engaging the housing for maintaining the housing in fixed position of adjustment about the journal.

14. A device as in claim 13, wherein the housing is slidable along the journal-like support, and is provided with means engaging the extension of the clamping means at all times during the sliding of the housing to maintain the angular adjustment of the housing unchanged.

15. In a device of the kind described, a feed mechanism for wire or wire-like elements, two sources of electric power, a motor deriving energy from one source for moving said wire in one direction, a second motor deriving energy from the other source for moving the wire in another direction, a switch for placing one of said motors in circuit, and means placing the other motor in circuit after a predetermined movement of said wire by said first motor.

16. A device as set out in claim 15, together with means for deriving one of said sources of power from the other source of power.

17. In an electrode feeding device, an electrode, a welding circuit including said electrode, a motor for moving the electrode to increase the length of the welding arc, a circuit through said motor, said circuit being closed through a portion of said welding circuit including said electrode, whereby the operation of said motor is changed in response to changes in the welding circuit through the electrode, and a separate means for moving the electrode in another direction.

18. A device of the kind described, including a welding circuit and an electrode feeding circuit; a pair of electrodes, means in said feeding circuit for causing one of said electrodes to approach the other, separately energized means for retracting said electrode, means closing the welding circuit only after said feeding circuit is closed, and means dependent upon energization of said welding circuit for energizing said retracting means.

19. A device as in claim 18, wherein said feeding means and said retracting means operate simultaneously, and means to integrate their separate effects.

20. In an electric arc welding device, an electrode circuit, means tending to move an electrode in a direction to shorten the arc, a second means tending to move it in the opposite direction, said first means acting at a constant speed, said second means being interconnected in said electrode circuit whereby it is actuated by a current having a potential equal to the algebraic sum of potential between the electrode circuit potential and an external potential, and so that its speed is varied upon change of this algebraic sum, and means integrating this variable speed against the constant speed whereby the direction of movement of the electrode is changed upon variation of the variable speed above or below the constant speed.

21. In a device of the kind described, a feeding mechanism for wire or wire-like elements, including a constant speed motor for driving the mechanism in one direction, a variable speed motor for driving it in the other, said drive being effected through a differential, and means for placing one motor in circuit after a predetermined movement of the wire by the other motor.

22. In an electrode feed device, an electric motor for feeding said electrode, means for controlling the speed of the electric motor and tending to limit the maximum speed thereof in response to predetermined electric conditions in an arc associated with said electrode, and means causing said electric motor to operate as a dynamic brake upon reaching a predetermined maximum speed.

23. In an electrode feed device, a compound wound motor, the current in the series field thereof being controlled by the welding circuit, whereby to fix a predetermined maximum speed therefor, and the shunt field providing a constant field whereby the motor will operate as a dynamic brake upon exceeding its predetermined maximum.

24. In a system of the kind described, an arc welding circuit, a feed motor circuit, a compound wound motor therein, the series field thereof being in series with the arc, whereby the speed of the motor is determined by conditions in the arc, and a maximum speed is set, and the shunt field providing a constant field that causes the motor to operate as a dynamic brake upon exceeding its given maximum speed.

25. In a feed mechanism, a first motor tending to feed the work, a second motor tending to retract the work, a differential for integrating the two tendencies, means for cutting off the mechanism including means to insure that the retracting motor will remain in circuit after the feed motor is cut off.

26. In a system of the kind described, an electrode, means for feeding or retracting the electrode including two motors, one to produce feeding and the other to produce retracting, means to cut-off said motors, including a time delay in the circuit of one whereby it will be energized after the other is cut off.

27. In a system of the kind described, an electrode, means including two motors, one to feed the electrode, and one to retract it, a welding circuit through the electrode, a cut off for the system including means to cut off one of the motors, a delay for retarding cut off of the other motor, and means responsive to cutting off of said last named motor for cutting off the welding circuit.

28. In a system of the kind described, an electrode, a welding circuit, means to feed or retract the electrode, a cut off to deenergize said feeding or retracting means including a delay to insure the retracting operation after the feeding operation has stopped, and means to maintain the welding circuit in operation as long as the retracting operation takes place.

29. In an electric welding system of the kind described, a main circuit, a converter in said circuit to produce a suitable welding current, a pair of electrodes, a constant speed means directly connectable into said main circuit for moving one of the electrodes in one direction, means responsive to changes in arc length for moving the electrode in another direction, and means energizable from said main circuit for providing electrical energy in suitable form for actuating said arc responsive means.

30. In a welding machine, a welder circuit, a carriage motor, a compound forward and reverse switch for said motor, means responsive to closure of the welding circuit for energizing said switch in either the forward or reverse position, and a means selecting one or the other position.

31. In a welding machine, a welding circuit, a carriage, electric means moving the carriage, a circuit for said means, a forward and reverse switch for said means, means responsive to closure of the welding circuit for closing the switch for either forward or reverse operation of the means, and a cut-off for the said circuit for said means.

32. In a welding machine, a welding circuit, a carriage travel means, a circuit for said means, a switch in said circuit, means responsive to energization of said welding circuit for operating the switch, manual means for operating the switch, and a common cut-off to both said last means.

33. An electric welding system comprising, a welder circuit, a welding electrode feed mechanism having differentially disposed driving portions, two circuits for energizing the differentially disposed portions of said electrode feed mechanism to cause it to feed the electrode, means for energizing one of said circuits, means responsive to the operation of said first named means for closing the welder circuit, and means responsive to welding current for closing the other feeding mechanism circuit.

34. An electric welding system comprising, a welder circuit, a welding electrode feed mechanism having differentially disposed driving portions, two circuits for energizing the differentially disposed portions of said electrode feed mechanism to cause it to feed the electrode, means for energizing one of said circuits, means responsive to the operation of said first named means for closing the welder circuit, means for so associating the other feeding mechanism circuit with the welding circuit that the feeding mechanism is actuated in accordance with conditions therein, and means responsive to welding current flowing in said welding circuit for closing said other feed mechanism circuit.

35. An electric welding system comprising a welding circuit, a welding electrode feed mechanism including differentially disposed driving portions, two feeder circuits for energizing the respective differentially disposed driving portions of the electrode feed mechanism, means for so connecting first one of said feeder circuits to said welding circuit that it is energized in accordance with the operative conditions thereof, means for energizing all of said circuits comprising means for rendering said welding system inoperative by deenergizing the second one of said feeder circuits and the associated driving portion of the feed mechanism while maintaining the energization of the welding circuit and the first one of said feeder circuits including the associated differential driving portion of said feeder mechanism.

36. A device of the kind described, including a direct current welding circuit, electrodes in said circuit adapted to move toward and away from one another, a source of alternating current, a constant speed alternating current motor for moving one of said electrodes in one direction, separate electrical means for moving one of said electrodes in the other direction, a source of independent potential including a direct current generator connected with said separate electrical means for supplying direct current thereto, means for driving said direct current generator from the alternating current source, and means for supplying current to the welding circuit.

37. A device of the kind described, including a direct current welding circuit, electrodes in said circuit adapted to move toward and away from one another, a source of alternating current, a constant speed alternating current motor for moving one of said electrodes in one direction, separate electrical means for moving one of said electrodes in the other direction, a source of independent potential including a direct current generator, said welding circuit and said electrical means being connected with said generator in parallel, and means for driving the generator from the alternating current source.

38. A device of the kind described, including a welding circuit, electrodes in said circuit, movable towards and from each other, means for producing said movement in one direction, separate electrical means for producing the same in the other, said last means having a regulating field, a source of independent potential for supplying current to said welding circuit, a source of potential for the separate electrical means, said regulating field being connected with the welding circuit across said electrodes.

LYNN S. BURGETT.